United States Patent [19]
Fisher

[11] 3,738,166

[45] June 12, 1973

[54] FINAL APPROACH TIMER

[76] Inventor: Martin Allen Fisher, 1244 S.W. 13 Court, Miami, Fla. 33135

[22] Filed: Oct. 27, 1971

[21] Appl. No.: 192,946

[52] U.S. Cl. ............... 73/178 T, 58/152 R, 73/384
[51] Int. Cl. ............................................. G01c 21/00
[58] Field of Search ................ 73/178 T, 179, 384; 58/152 R, 39.5

[56] References Cited
UNITED STATES PATENTS
2,289,038   7/1942   Putnam .......................... 58/152 R Primary Examiner—Donald O. Woodiel

[57] ABSTRACT

A combination clock and altitude indicator arrangement incorporating a limited time stop clock settable any time to five minutes, the minute hand extending beyond the minute markers to a card insertable into a slot beside the minute markers whereby the minute hand points to the minutes remaining as well as the feet of altitude scribed on the inserted card.

5 Claims, 4 Drawing Figures

PATENTED JUN 12 1973          3,738,166

INVENTOR
MARTIN ALLEN FISHER
*Martin Allen Fisher*

FINAL APPROACH TIMER

BACKGROUND OF THE INVENTION

1. Field

This invention relates to aircraft instruments and more particularly to a combination of a special aircraft clock and a card selectable for a desired rate of decent showing the altitude desired during an approach to an airfield.

2. Description Of The Prior Art

Two aircraft instruments necessary for instrument flight include a clock and an altimeter. These instruments are utilized to time the approach to airfields from a navigational fix a certain distance and specified altitude from the field or the touch-down point. The pilot must observe and coordinate the two instruments during the approach first noting the time over the fix at the designated altitude, then establish and maintain a rate of decent on the rate of decent instrument, and finally, arrive at a minimum decent altitude or the boundry of the field at or by the expiration of a certain amount of time selected for the ground speed of the aircraft. The said rate of decent instrument is a pressure differential measuring device and fluctuates during turbulence becoming unsatisfactory, as it must therefore be averaged by the pilot which leaves his glide slope progress to chance.

The broad purpose of this invention is to provide an apparatus which presents at a glance one pointer showing the time remaining as well as the exact desired altitude at any moment during the approach.

The problem and the way it is done today may be shown in the following example: The published approach is from over the fix to the runway, a distance of 3 nautical miles. The published altitude over the fix is 1,700 feet. There is no wind. The approach speed is 90 knots. The airport is at sea level. The minimum decent altitude is 500 feet. The pilot desires to decend to the field boundry for a circling approach. This amounts to a decent rate of 600 feet per minute for exactly 2 minutes. His technique may vary some but he starts out approaching the fix at 1,700 feet at his approach speed, notes the time when he crosses it and sets up a rate of decent on the rate of decent instrument. In this easy example he can compute in his head that he must decend a hundred feet every 10 seconds, however many other things demand his attention so he concerns himself with attempting to hold the decent rate and the indicated speed while monitoring the altimeter which is moving counterclockwise and the clock moving in the opposite direction. Turbulence on the approach throws his altitude/time schedule off as well as makes coordinating these counter-rotating instruments most difficult leading to a loss of coordination of the two and resulting in a poor or missed approach. The invention therefore is a computer which solves the distance equals rate times time problem and it does so constantly while the pilot is on his approach thus providing him with a continuous picture display of his desired altitude.

SUMMARY

It is therefore the object of the present invention to provide a special clock, which counts down, indicates a hand going down, pointing to minutes and fractions of minutes and also pointing with the same pointer to an altitude scale showing the altitude desired to be at the time remaining, said altitude scale being on a card or curved rigid ruler which adjusts by sliding thereby allowing the final altitude to be set adjacent to the zero time remaining.

Another object of the present invention is to provide several altitude scales arranged according to a desired rate of decent thereby providing the pilot with a choice of ground speeds, the latter being influenced by winds and aircraft type and weight.

Another object of the present invention is to provide an unsophisticated, inexpensive tool which may be available, due to simplicity and low cost, to the vast majority of pilots, those low time, low experience pilots; thereby offering instrument approach assistance to the high accident rate area of present aviation.

Still additional objects, benefits, and advantages of this invention will become evident from the study of the following detailed description taken in conjunction with the accompanying drawing, in which.

Figure 1:
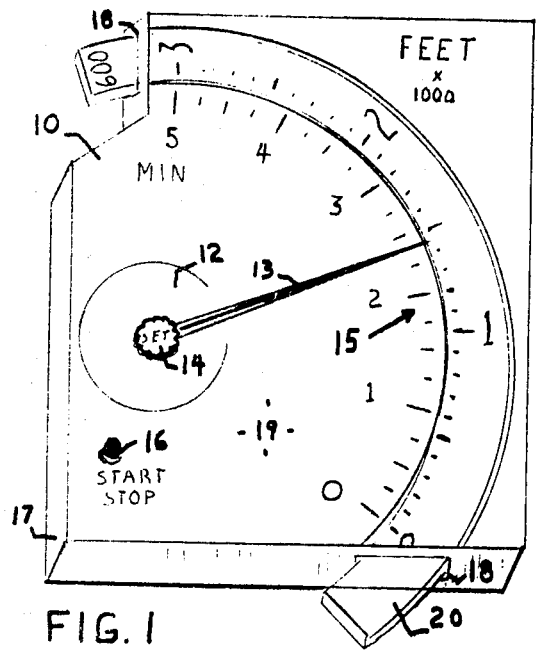
FIG. 1 is a perspective view of the aircraft final approach timer made in accordance with the present invention.
Figure 2:
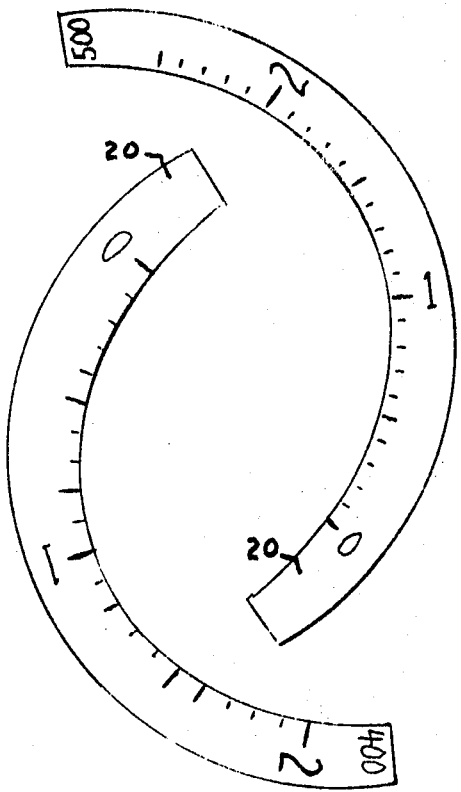
FIG. 2 is a side view of two altitude scales which may slide into and replace the one shown in FIG. 1.
Figure 3:
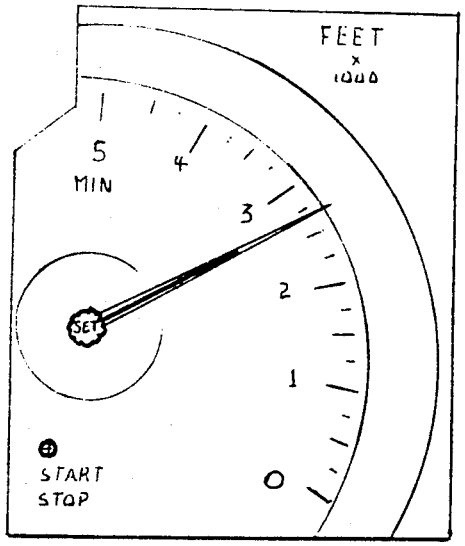
FIG. 3 is a side view of the final approach timer clock assembly.
Figure 4:
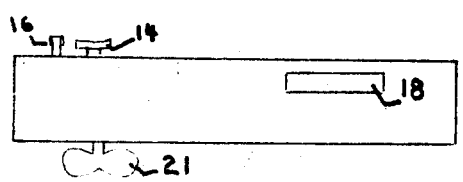
FIG. 4 is a bottom view of FIG. 3.

Referring now specifically to the drawing, a final approach timer 10 made in accordance with the present invention is shown to include a start and stop controlled spring clock 12 having a single minute hand 13 which is geared to move 24° per minute instead of 6° per minute normal clock speed, a set button 14 which declutches the minute hand for setting it opposite any selection of minutes up to 5 on the minute scale 15. A stop-start button 16 of the spring loaded push to stop, push to start type. Said clock, hand and controls encased in a closure 17 which has a tunnel 18 running from an entry above the clock to an exit at the base of the case closure to the lower right of the clock position. A transparent surface 19 whereby the hand of the clock and the markings may be seen. A set of arcuate scales 20 which slide snugly into the tunnel each having a different scale on each side corresponding to the rates of decent of 400, 500 600, 700, 450, 550, and 650 feet per minute. A clock winding key 21.

The operation of this device will now be readily understood. A pilot preparing for an instrument approach to a facility which has only a non-precision approach available will examine the published approach plate and on his final approach timer set the time required opposite the final approach fix altitude using the scale he desires to fly and then sets the clock hand to begin at that altitude. Then as he crosses over the fix he pushes the start button and monitors his altitude against the final approach timer. If he encounters turbulence, or he gets off his rate indicator he may crosscheck the final approach timer which will indicated the altitude he should be at the time.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. An aircraft instrument approach timer that comprises, in combination a count-down clock device which counts down from 5 minutes to zero on a 120° scale, with a hand/pointer which moves clockwise so that the tip of the hand/pointer moves from an up position towards a down position along an arc on the left side of which is scribed/printed the time scale with the 5 near the top, the 4 to the right and below the 5, and the 3 to the right and below the 4, etc, down the inside of the arc to the zero, with lines running beside the numbers to the arc and other lines between these lines to indicate fractions of minutes, and on the outside of said arc is a movable altitude scale being scribed on a flat narrow arcuate insert and being held next to the time scale by being encased in an arcuate tunnel slot, and said altitude scale being adjustable by manually sliding within said slot and being stopped in said slot at a desired position so that a chose altitude number can be placed adjacent to a chosen time creating a relationship of the scales so that the pointer/clock hand when operating will indicate a lessening of time and a lowering of altitude or at any instant, the time remaining and the programmed altitude; and also, the said altitude scale may be manually removed from said slot and another altitude scale inserted into said slot allowing each of a set of altitude scales to be used, said other altitude scales in the set being scaled each to a different rate of feet per minute.

2. A final approach timer as set forth in claim 1, wherein the clock is the push button, start stop type and the indicator hand is settable by pressing a button clutch at the center thereof and turning said button and releasing same at the desired pointing of the said hand.

3. A final approach timer as set forth in claim 1, wherein the face is transparent in the area of the hand and the scales to which said hand points.

4. A final approach timer as set forth in claim 1, wherein the clock is encased in an enclosure which incorporates a circular tunnel slot opening above the clock and running clockwise to the lower right bottom exit, said tunnel slot to hold one of the curved altitude rate scales which insert from either end opening.

5. A final approach timer as set forth in claim 1, wherein the altitude rate scales are printed/scribed on both sides of the arcuate, flat narrow inserts and each scaled to match the minutes markers at 300, 350, 400, 450, 500, 550, 600, 650, 700, 750, 800, and 850 feet per minute.

* * * * *